United States Patent [19]

Hassbjer

[11] Patent Number: 5,581,354
[45] Date of Patent: Dec. 3, 1996

[54] METHOD AND DEVICE FOR THICKNESS ASSESSMENT

[75] Inventor: Nicolas Hassbjer, Halmstad, Sweden

[73] Assignee: Hassbjer Micro System Aktiebolag, Halmstad, Sweden

[21] Appl. No.: 495,079

[22] Filed: Jun. 27, 1995

[30] Foreign Application Priority Data

Jun. 27, 1994 [SE] Sweden ................................ 9402247

[51] Int. Cl.$^6$ ................................................ G01B 11/00
[52] U.S. Cl. ...................... 356/381; 356/394; 250/559.2; 250/559.27
[58] Field of Search ...................... 356/381, 382, 356/394, 429; 250/559.06, 559.16, 559.2, 559.27, 559.28, 559.1

[56] References Cited

U.S. PATENT DOCUMENTS

| | | |
|---|---|---|
| 4,095,098 | 6/1978 | Looper . |
| 4,203,032 | 5/1980 | Haunstetter et al. . |
| 4,437,332 | 3/1984 | Pittaro . |

FOREIGN PATENT DOCUMENTS

| | | |
|---|---|---|
| 8800938 | 3/1988 | Sweden . |

Primary Examiner—Richard A. Rosenberger
Assistant Examiner—Amanda Merlino
Attorney, Agent, or Firm—Oblon, Spivak, McClelland, Maier & Neustadt, P.C.

[57] ABSTRACT

In a method for assessing the thickness of a measuring object (A), light is emitted towards the object, and the intensity of the light transmitted through the object is measured, resulting in a measurement curve (Y). The measurement curve is compared with a calibration curve (P), which has been determined in similar fashion for a calibration object, in order to identify at least one interval of the measurement curve within which the intensity varies in the same manner as within one interval of the calibration curve. The average value of the intensity in the respective intervals is determined, and the thickness of the object is assessed on the basis of a comparison between the average values. Alternatively, one identifies at least one interval of the measurement curve including points of either the highest or the lowest intensity in the curve. The average value of the intensity in this interval is determined and is compared with the average value of the intensity in at least one interval of the calibration curve, this interval including points of either the highest or the lowest intensity in the calibration curve. A device for implementing the method is also disclosed.

16 Claims, 3 Drawing Sheets

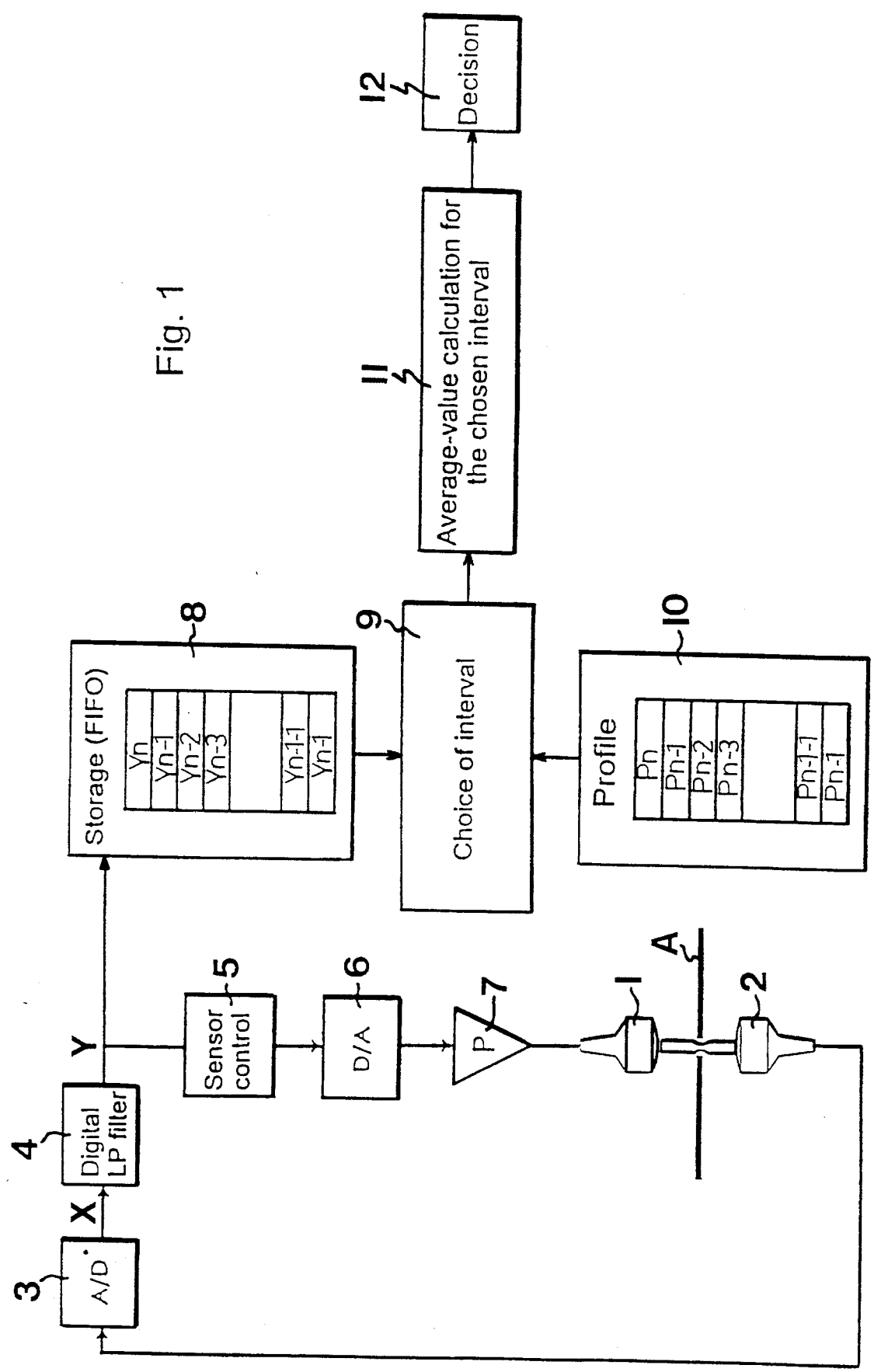

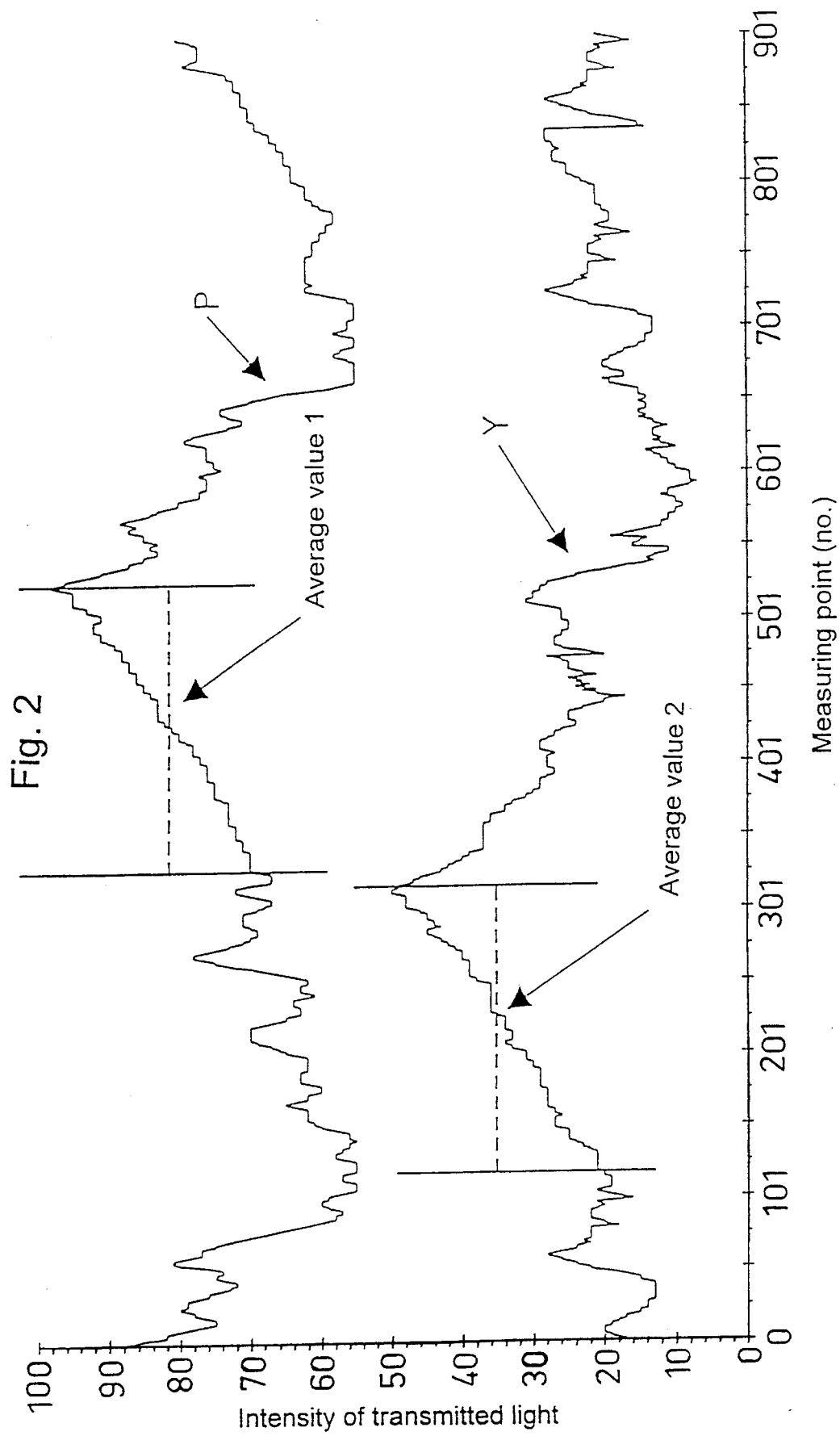

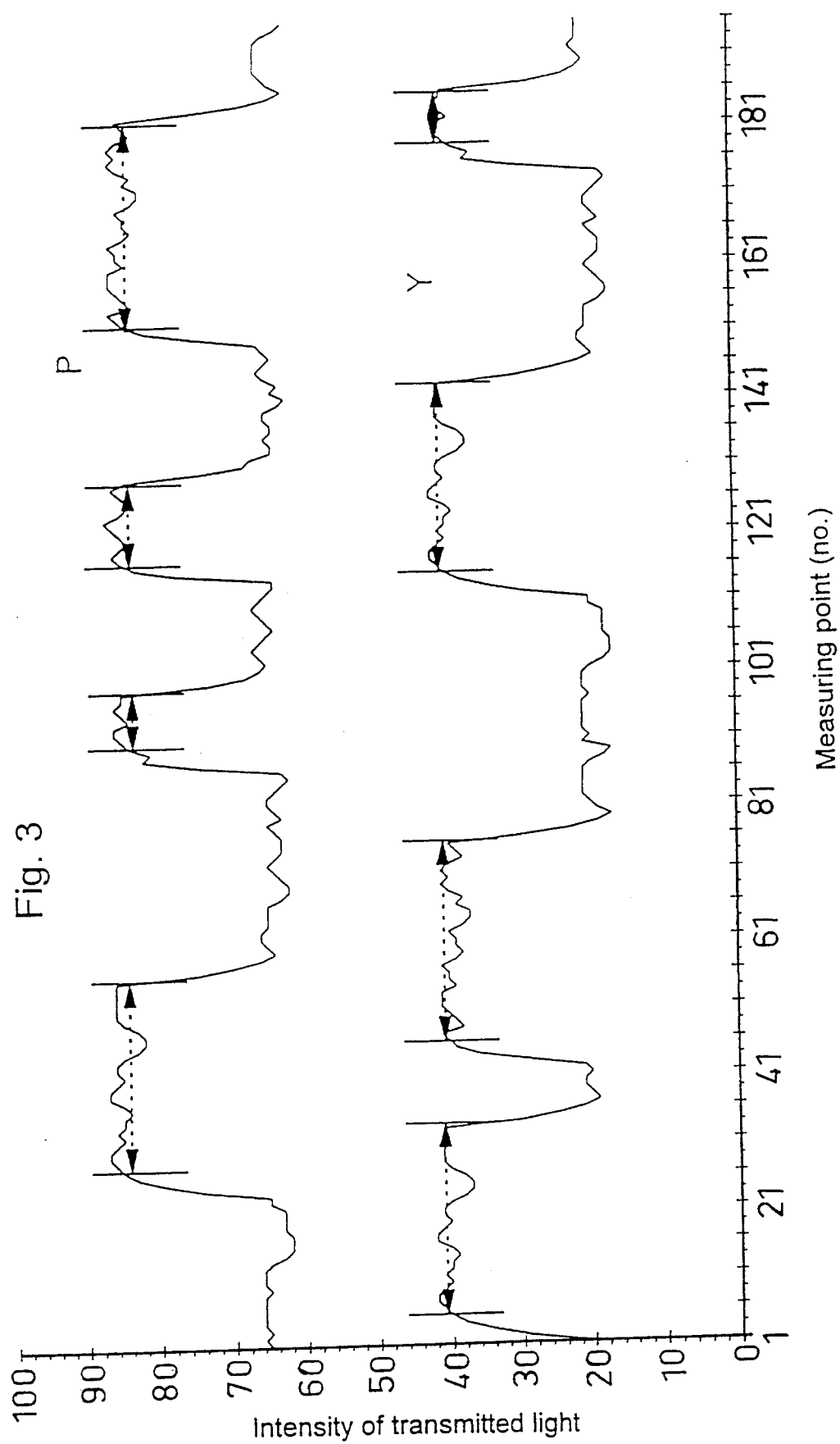

METHOD AND DEVICE FOR THICKNESS ASSESSMENT

BACKGROUND OF THE INVENTION

This invention relates to a method for assessing the thickness of a measuring object, wherein light is emitted towards said object, and the intensity of the light transmitted through said object is measured.

The invention also concerns a device for implementing the inventive method.

DESCRIPTION OF THE PRIOR ART

In the graphic industry, there is often a need of checking that a single sheet of paper at a time is being fed along a path in various machines. Such machines include collators, sorters, enveloping machines and inserters.

This check can be performed automatically by having the sheets pass between a light source and a light sensor arranged opposite thereto. When a sheet is located between the light source and the light sensor, it will absorb part of the light emitted by the light source, such that the intensity of the received light, i.e. the intensity of the light transmitted through the sheet, is lower than that of the emitted light. The size of the intensity reduction is, among other things, due to the thickness of the sheet. By comparing the intensity of the transmitted light with a reference value established in advance for a sheet of the type at issue, it is possible to determine the thickness of the sheet and thus decide whether the sheet really is a single sheet or whether two sheets have adhered to each other and are being conveyed together as if they were a single sheet. To be more specific, a single sheet is considered to have been located between the light source and the light receiver during the measurement if the intensity of the transmitted light essentially agrees with the reference value, and the sheet is considered to have been double if the intensity value is approximately half of the reference value.

This check is performed at one point on each sheet. Since the transmittance may vary over the sheet, for instance as a result of print, the check must, however, be carried out on one and the same spot on each sheet in order that the comparison with the reference value should give a reliable result. To this end, the thickness assessment is, as a rule, synchronised with the feeding of the path, for instance by making an assessment every time a transducer has detected a predetermined conveyance of the path. In actual practice, however, the thickness assessment is often performed on different spots on the sheet, since the sheets when placed on the path may come to occupy different positions and be differently spaced apart.

Even if one were to succeed in performing the check at one and the same point on all the sheets, one could, however, not be sure of obtaining correct results. The position of print, if any, on the sheet of paper may vary, such that a given spot on the paper is sometimes provided with print and sometimes not. Furthermore, a varying amount of pores and a varying fibre content of the sheets may give rise to variations of the intensity of the light transmitted, which bear no relation to the thickness.

The problems described above are also encountered elsewhere in industry, where one wishes to assess the thickness of a measuring object on the basis of the intensity of light transmitted through the object. The purpose of such a thickness assessment may, for instance, be to obtain an explicit value of the thickness of the measuring object, to check that the measuring object has a desired thickness, to determine the number of sheetlike layers of the measuring object, or to check that the measuring object contains a desired number of layers.

SUMMARY OF THE INVENTION

One object of the present invention thus is to provide a method and a device solving the problems mentioned above.

Another object of the invention is to provide a method and a device yielding more accurate measuring results and reducing the risk of errors occurring in the check of the measuring objects.

According to the invention, these objects are achieved by a method and a device having the distinctive features recited in the appended claims.

The invention is based on the idea of trying to locate such spots on the measuring objects for performing the thickness assessment as are compatible in so far as other transmittance-affecting parameters than the thickness are as similar as possible.

These compatible spots may be found by measuring the intensity of the transmitted light at a plurality of points along the sheet and comparing the thus-obtained measurement curve with a previously determined calibration curve, so as to identify at least one interval of the measurement curve within which the intensity varies in the same manner as within one interval of the calibration curve. These intervals are considered to be associated with compatible spots on the measuring sheet and the calibration sheet and are therefore used in the thickness assessment. Alternatively, one identifies at least one interval of the measurement curve that includes points having the highest (lowest) intensity in the measurement curve. The average value of the intensity in this interval is determined and compared with the average value of the intensity in at least one interval of the calibration curve, this interval including points having the highest (lowest) intensity in the calibration curve.

BRIEF DESCRIPTION OF THE DRAWINGS

An embodiment of the invention will now be described in more detail with reference to the accompanying drawings, in which FIG. 1 is a block diagram illustrating an embodiment of the device according to the invention;

FIG. 2 is a diagram illustrating how compatible intervals are identified in a measurement curve and a calibration curve in a first mode of implementation of the invention; and FIG. 3 is a diagram analogous with that of FIG. 2 and illustrates how compatible intervals are identified in a measurement curve and a calibration curve in a second mode of implementation of the invention.

DESCRIPTION OF THE PREFERRED EMBODIMENT

As appears from FIG. 1, a device according to the invention comprises a light source 1, a light sensor 2, as well as electronic equipment for controlling the light source and assessing the thickness of the measuring object on the basis of the light received by the light sensor 2. The light source 1 may, for instance, consist of a light-emitting diode or the like, emitting light of a given wavelength. The light sensor 2 may consist of a light-sensitive semiconductor, such as a photodiode or a phototransistor.

The light source 1 and the light sensor 2 are arranged opposite to each other, such that a measuring object A, for instance a sheet of paper, may pass between them. The light sensor 2 is connected to an analog-to-digital converter 3, which in turn is connected to a signal-processing device, e.g. a digital low-pass filter 4 or another signal extraction element. The output of the filter 4 is connected to a sensor-controlling means 5 which, via a digital-to-analog converter 6 and an amplifier 7, is connected to the light source 1 and is adapted to control the latter.

The output of the filter 4 is further connected to a buffer 8 of FIFO type, from which the values are outputted in the same order as they are inputted. The output of the FIFO buffer is connected to an interval-identification means 9, which is adapted to identify one of more parts of a measurement curve that are to be used in the thickness assessment, where they are compared with one or more comparable parts of a previously determined calibration curve. The calibration curve is stored in a memory 10, which is connected to the identification means 9. The buffer 8, the identification means 9 and the memory 10 are all connected to a calculation means 11 adapted to calculate the average values of the identified intervals. This calculation means 11 is connected to a decision means which, on the basis of the average values calculated, decides whether the measuring object is, say, a single or a double sheet, whether the measuring object is too thin or too thick, or whether the measuring object comprises a desired number of sheetlike layers. Conveniently, all processing of the measurement values, as well as the sensor control, may be performed with the aid of a microcomputer, for which reason the blocks 4, 5 and 8–12 in FIG. 1 may be implemented with the aid of program modules.

Here follows a description of how the device operates when used for checking that only one sheet at a time is conveyed along a path.

When a transducer (not shown) disposed adjacent to the device driving the path emits a signal indicating that the path has been fed forwards to such an extent that a sheet should be located in a suitable position between the light source 1 and the light sensor 2, the sensor-controlling means 5 causes the light source 1 to emit light pulses of a certain frequency and intensity during a given period. The time and the frequency have been so chosen that at least 100 measuring points are obtained along a measurement stretch of 5–10 cm. It should here be pointed out that the light need not be pulsed, but that use may also be made of continuous light.

The light pulses are transmitted through the sheet A, which absorbs some of the light, and is received by the light sensor 2, the intensity of the received light pulses being thus lower than that of the emitted pulses.

The received pulses are analog-to-digital converted by the analog-to-digital converter 3 and are then low-pass filtered by the digital filter 4 and stored in the buffer 8.

As mentioned in the foregoing, the present invention is based on the idea of measuring the intensity of the transmitted light at a plurality of points along the sheet and comparing the thus-obtained measurement curve with a calibration curve, so as to identify at least one interval of the measurement curve corresponding to one interval of the calibration curve, thus ensuring that the thickness assessment is based on compatible values of the intensity of the transmitted light.

Before the device can be put to a specific use, it thus has to be suitably calibrated. In the application described here, a sheet of paper is fed through the device, an operator checking manually that it is really just one sheet. A calibration curve for this sheet is established by determining the intensity of the transmitted light at a plurality of points along a calibration stretch on the sheet. Then, the calibration curve is stored in the memory 10. The calibration may, of course, be based on several sheets, in which case the average value of every point in the calibration curves established is used for creating the final calibration curve.

When the intensity of the transmitted light has been determined for a plurality of points on a sheet and been stored in the buffer 8 in the form of a measurement curve, as described in the foregoing, the measurement curve is compared with the calibration curve by the identification means 9. When the identification means 9 has identified an interval of points in the measurement curve within which the intensity of the transmitted light varies in the same manner as within an interval of the calibration curve, these two intervals are considered to be associated with compatible parts of the sheet. It should be observed that these compatible parts need not be located on the same spot of the measuring sheet and the calibration sheet, but they are positioned in the same way in relation to print, coloured portions and the like, such that these parameters affect the calibration and the measurement in the same fashion. Thus, variations of the transmittance may be regarded to be due primarily to thickness variations.

Thereafter, the average value of the intensity of the transmitted light is determined in the identified interval of the measurement curve as well as in the identified interval of the calibration curve. (If no compatible intervals are found, the average values for the entire measurement curve and the entire calibration curve are determined.) Then, the two average values are compared with each other. If these values are essentially the same, only one sheet is considered to have passed between the light source and the light sensor. If, however, the average value of the measuring object is approximately half of the calibration average value, two sheets are considered to have passed the device, and an alarm is given, indicating the presence of a double sheet. Finally, if the average value of the measuring object is much higher than the calibration average value, the conclusion is that no sheet was located in the device during the measurement, and an alarm is given, indicating the absence of a sheet. In the comparison, the quotient of the average values is suitably determined, such that the relative thickness of the measuring object in relation to the calibration object is obtained.

FIG. 2 shows the intensity of the transmitted light as a function of the measuring points of a calibration curve P as well as a measurement curve Y. In the curves are indicated those intervals of measuring points that are regarded as compatible owing to similar variations of the light intensity. The length of these intervals may vary from one sheet to another and may, in rare cases, be identical with, respectively, the entire measurement stretch and the entire calibration stretch. In the example illustrated in FIG. 2, the average value of the intensity of the transmitted light in the interval of the measurement curve is half of the corresponding average value for the calibration curve, the conclusion being that a double sheet has passed the device when the measurement curve was established.

The method described above of finding compatible intervals of the measurement curve and the calibration curve is primarily intended to be used in applications where the position of the measuring object on the path and the position of print or the like vary but to a small extent in the lateral direction, such that the patterns found along the measurement stretches on the measuring objects and along the calibration stretch on the calibration object are approximately the same.

FIG. 3 illustrates a method suited for use when the lateral variations are considerable and it therefore is difficult to find intervals of the calibration curve and the measurement curve where the intensity varies in a similar fashion. In this method, the thickness assessment is based on those parts of the measurement curve and the calibration curve that correspond to spots on, respectively, the measuring object and the calibration object where there is no print. In the case of a white sheet with print on it, the thickness assessment involves the white parts of the sheet. In order to identify one or more intervals of the measurement curve corresponding to white parts of the sheet, a predetermined number of points of the highest intensity, for instance 10% of the number of measuring points, can be identified in the measurement curve Y, as illustrated in FIG. 3. Thereafter, the average value of these identified points is determined and compared with the average value of the same number of points having the highest intensity in the calibration curve P, so as to assess the thickness of the measuring object. Alternatively, all the points in the measurement curve having an intensity exceeding a predetermined threshold value can be identified, and the average value of the intensity at these points can be compared with the average value of the intensity at corresponding points in the calibration curve, so as to assess the thickness of the measuring object.

In the case with light print on a dark background, use is, of course, made of the points of the lowest intensity instead of those of the highest intensity.

When a whole set of sheets is printed with the same print, the intensity of the print may come to vary within the set. For instance, the print may become gradually weaker. Furthermore, the material of which a set of measuring objects is made may vary. In order to prevent that such, often slow variations of parameters affecting the transmittance of the measuring object give rise to errors in the measurement operation, the calibration curve may advantageously be updated as the measurement proceeds.

Such updating may be performed in the following manner. When an object has been measured and it has been established that the object consists of a single sheet, as desired, the difference between the average value of the measurement interval and the average value of the calibration interval is determined. Then, the whole calibration curve is parallel-offset by, for instance, half of the difference between the two average values.

Another problem encountered in devices of the type described above is the difficulty of finding light sensors that are linear within a large area and thus are able to measure with high accuracy objects made from different materials and having different thicknesses. In order to solve this problem, use is, according to the invention, made of a sensor that is linear within a smaller area, and one instead varies the intensity of the light source, such that the intensity of the transmitted light is at all times located within the linear area of the receiver. To this end, the sensor-controlling means 5 is adapted to receive the output signal from the filter 4 and to control, via the digital-to-analog converter 6 and the amplifier 7, the intensity of the light emitted by the light source 1 as a function of the intensity received by the light sensor 2.

When the intensity of the emitted light is not constant, it is, of course, impossible to compare the measurement curve and the calibration curve directly, but every point of the two curves first has to be normalised with respect to the intensity of the light emitted when the point was recorded.

In the above embodiment of the inventive device, the thickness assessment is synchronised with the feeding of the path, and the light source 1 only emits light pulses during a predetermined measuring period. Alternatively, the device may detect the front edge of every sheet passing through it. For this purpose, the light source 1 continuously emits light pulses, and the front edges of the sheets are detected when the intensity of the received light suddenly falls below that of the emitted light. When the front edge of a sheet has been detected, the device preferably waits for a certain time before recording the measurement curve. By detecting a predetermined alteration of the intensity of the received light, the device may also in some cases find a given spot on a measuring object where the thickness is to be measured.

When calibrating the inventive device in view of a specific application, or when continuously updating the calibration curve, the device automatically checks that the calibration curve is located within a measurement area that it is capable of processing. If need be, it also verifies that the double-sheet check, the check on too-thick material, the check on the absence of a sheet, or the check on too-thin material may be performed. If any intended check cannot be carried out, the device automatically switches this function off. This may be an advantage, for instance when several stations are to be checked separately and one station is not used for the time being. If so, the device need not be switched off, but it is calibrated for no sheet, which means that it will give an alarm only if a sheet passes it.

The above description focuses on a mode of implementation, in which the method and the device according to the invention are used for checking that only one sheet at a time is fed on a path.

However, the method and the device according to the invention may also be used for e.g. checking that another predetermined number of sheets at a time are fed on the path; assessing whether the thickness of a measuring object falls within a desired interval, which can be defined on the basis of the relative thickness; determining an explicit value of the thickness of the measuring object, which however requires that the thickness of the calibration object is known; or explicitly determining the number of sheets or sheetlike layers of a measuring object.

What I claim and desire to secure by Letters Patent is:

1. A method for assessing the thickness of a measuring object, wherein light is emitted towards said object, and the intensity of the light transmitted through said object is measured, characterised by determining a measurement curve (Y), which represents the intensity, along a measurement stretch of said object, of the light transmitted through said object; identifying at least one interval of the measurement curve; and comparing the intensity in the identified interval with the intensity in a corresponding interval of a calibration curve (P), which represents the intensity of light that has been transmitted through a calibration object along a calibration stretch, in order to asses the thickness of the measuring object, the identified interval of the measurement curve and the corresponding interval of the calibration curve representing comparable parts of the measuring object and the calibration object.

2. A method as claimed in claim 1, characterised in that the interval of the measurement curve is identified by identifying a predetermined number of points in the measurement curve having the highest intensity.

3. A method as claimed in claim 1, characterised in that the interval of the measurement curve is identified by identifying a predetermined number of points in the measurement curve having the lowest intensity.

4. A method as claimed in claim 1, characterised in that the interval of the measurement curve is identified by identifying those points in the measurement curve whose intensity exceeds a predetermined threshold value.

5. A method as claimed in claim 1, characterised in that the interval of the measurement curve is identified by identifying those points in the measurement curve whose intensity falls below a predetermined threshold value.

6. A method as claimed in claim 1, characterised in that the interval of the measurement curve is identified by identifying an interval within which the intensity variations substantially agree with the intensity variations within an interval of the calibration curve.

7. A method as claimed in claim 1, characterised in that the assessment of the thickness of the measuring object comprises the step of determining an explicit value of the thickness of the measuring object or an explicit value of the number of sheetlike layers of said object.

8. A method as claimed in claim 1, characterised in that the assessment of the thickness of the measuring object comprises the step of assessing whether said thickness falls within a desired interval or whether the number of sheetlike layers of said object is the desired number.

9. A method as claimed in claim 1, characterised in that the assessment of the thickness of the measuring object comprises the step of assessing whether the measuring object is too thin or too thick, and that, when establishing the calibration curve, a check is performed on whether a measurement curve for a too-thick or too-thin measuring object will fall within a predetermined measurement area and, if this is not so, the corresponding assessment is not carried out.

10. A method as claimed in claim 1, characterised in that, when assessing the thickness of said measuring object, the average value of the intensity of the transmitted light is calculated in said interval of the measurement curve and compared with the average value of the intensity of the transmitted light in said interval of the calibration curve.

11. A method as claimed in claim 8 or 10, characterised in that, if said thickness or said number is found to agree with the desired thickness or number, the level of the calibration curve is altered as a function of the difference between said average values for the calibration curve and the measurement curve in order to produce a continuous calibration.

12. A method as claimed in claim 1, characterised in that the intensity of the transmitted light is determined at 100 points at the least along the measurement stretch and the calibration stretch.

13. A method as claimed in claim 1, characterised in that the intensity of the emitted light is adjusted as a function of the intensity of the transmitted light, and that the measurement curve and the calibration curve are normalised with respect to the intensity of the emitted light.

14. A method as claimed in claim 1, characterised in that the presence of a measuring object or of a predetermined spot on said object is detected by locating a predetermined variation of the intensity of the received light.

15. A device for assessing the thickness of a measuring object, comprising a light source (1) and a light sensor (2), which are disposed opposite to one another and are spaced apart to enable the passage of a measuring object (A) therebetween, characterised by a first memory means (10) for storing a calibration curve representing the intensity of the light that has been transmitted through a calibration object along a calibration stretch, a second memory means (8) for storing a measurement curve representing the intensity of light that is received by the light sensor (2) during a measurement period, and comparing means (9) for comparing the intensity in one interval of the measurement curve with the intensity in a corresponding interval of the calibration curve.

16. A device as claimed in claim 15, characterised by means (5–7) for adjusting the intensity of the light source (1) as a function of the intensity of the light received by the light sensor (2).

* * * * *